United States Patent [19]

Jaeggi

[11] Patent Number: 4,577,494
[45] Date of Patent: Mar. 25, 1986

[54] APPARATUS AND METHOD FOR MEASURING THE WEAR OF RAILROAD RAIL

[75] Inventor: Hans P. Jaeggi, Lugano, Switzerland

[73] Assignee: Jackson Jordan, Inc., Ludington, Mich.

[21] Appl. No.: 524,724

[22] Filed: Aug. 19, 1983

[51] Int. Cl.⁴ .............................................. G01B 5/28
[52] U.S. Cl. ...................................... 73/105; 73/146; 33/287; 33/552
[58] Field of Search ...................... 73/105, 146; 33/10, 33/174 P, 287, 551, 552, 553, 554

[56] References Cited

U.S. PATENT DOCUMENTS 4,075,888  2/1978  Buhler .
4,288,855  9/1981  Panetti .
4,391,134  5/1983  Theurer ............................... 73/146

FOREIGN PATENT DOCUMENTS 1503891  10/1966  France .

OTHER PUBLICATIONS

*Railroad Track Theory and Practice*, Edited by Fritz Fastenrath; Frederick Ungar Publishing Co., 1981; pp. 281-292 and 1296-1314.
Jean-Pierre Fortin and Jean Fourcade, "La Mesure des Defauts de Faible Langueur d'Onde par un Procede Geometrique"; Revue Generale des Chemins de Fer, Mar. 1978.

*Primary Examiner*—Stewart J. Levy
*Assistant Examiner*—Tom Noland
*Attorney, Agent, or Firm*—Leydig, Voit & Mayer, Ltd.

[57] ABSTRACT

In accordance with the present invention, there is provided a chassis adapted for travel along a railroad rail with the chassis having a plurality of bearing points located between the chassis and the rail for supporting the chassis on the rail and for allowing movement of the chassis over the rail. The bearing points are aligned along a reference line and are at least variably spaced on opposite sides of a sensing point mounted on the chassis. At least one bearing point on each side of the sensing point contacts the rail surface as the chassis moves over the rail. A sensing device is provided at the sensing point for continuously sensing the distance between the reference line and the surface of the rail as the chassis travels along the rail. The sensing device has an output which is a function of the sensed distance between the reference line and the rail surface. A device, such as a strip recorder, is responsive to the output of the sensing device to indicate the corrugations and undulations in the rail surface.

20 Claims, 12 Drawing Figures

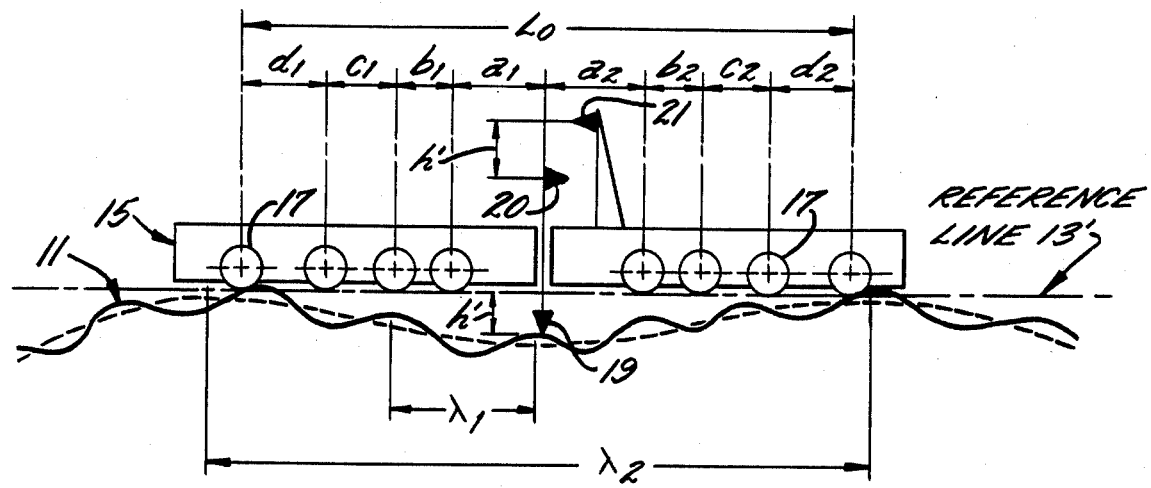
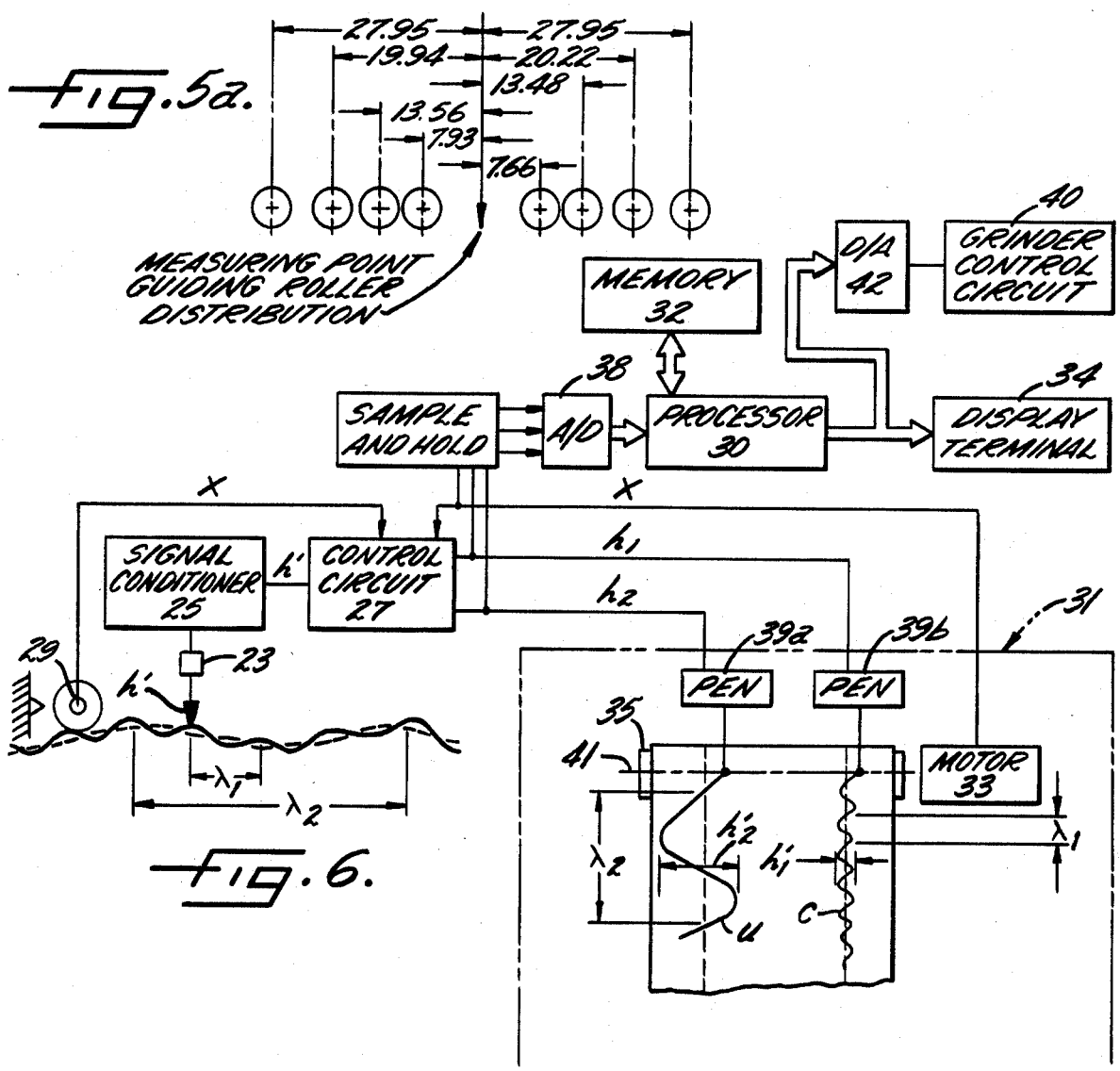

4,577,494

APPARATUS AND METHOD FOR MEASURING THE WEAR OF RAILROAD RAIL

BACKGROUND OF THE INVENTION

This invention relates to an apparatus and method for measuring corrugations and undulations in the contour of railroad rails caused by wear along and across the surface of the rail.

It is well known that rail surfaces experience wear, and, particularly in curves, the surfaces tend to wear unevenly, often developing corrugated and undulatory surfaces. Up to certain limits, worn rails may be renewed by grinding their running surfaces. A first step in dealing with track wear through grinding lies in accurately measuring the wear. Such measurement can then be used in planning efficient rail grinding programs, controlling the actual grinding effort, and checking the contour after the grinding is complete. One of the principal difficulties in measuring rail surface contour is in establishing a reference against which to measure while moving at a relatively high rate of speed. The only practical approach seems to be carrying the measuring device along the rails themselves, but such an approach has the inherent problem of at least indirectly establishing the reference point for measuring the contour from the very contoured rail surface. Consequently, the moving reference point creates a reference line which is susceptible to vertical movement which creates inaccuracies in the measured rail surface contour.

It is a primary object of the present invention to provide an improved apparatus and method for sensing the contour in railroad rails which exhibits a good response, or transfer function, over the entire range of corrugation and undulation wavelengths likely to be encountered. In this connection, a related object of the invention is to provide a device for sensing the contour in railroad rails which does not require synchronization of multiple sensors.

It is another object of this invention to provide an improved apparatus and method for sensing the contour in railroad rails which is not significantly affected by the corrugations and undulations in the rail surface.

A further object of this invention is to provide an improved apparatus and method for sensing the contour in railroad rails which achieves the foregoing objects even at a relatively high speed over the rail surface.

It is still another object of this invention to provide an improved apparatus and method for sensing the contour in a railroad rail which achieves the foregoing objects which can be used both as a measuring device or as a sensing and control device in a grinding system.

Other objects and advantages of the invention will be apparent from the following detailed description and the accompanying drawings.

SUMMARY OF THE INVENTION

In accordance with the present invention, there is provided a chassis adapted for travel along a railroad rail with the chassis having a plurality of bearing points located between the chassis and the rail for supporting the chassis on the rail and for allowing movement of the chassis over the rail. The bearing points are aligned along a reference line and are asymmetrically spaced on opposite sides of a sensing point mounted on the chassis. At least one bearing point on each side of the sensing point contacts the rail surface as the chassis moves over the rail. A sensing device is provided at the sensing point for continuously sensing the distance between the reference line and the surface of the rail as the chassis travels along the rail. The sensing device has an output which is a function of the sensed distance between the reference line and the rail surface. A device, such as a strip recorder, is responsive to the output of the sensing device to indicate the corrugations and undulations in the rail surface.

BRIEF DESCRIPTION OF THE DRAWING

In the drawings:

FIG. 5 is a diagram of a measuring device in accordance with a first embodiment of the invention;

FIG. 5a is a diagram of the spacial relationship between rollers for a measuring device constructed in accordance with a preferred embodiment;

FIG. 6 is a schematic representation of a measuring and recording system which may utilize the measuring device according to the invention;

DESCRIPTION OF THE PREFERRED EMBODIMENTS

While the invention has been shown and will be described in some detail with reference to specific exemplary embodiments, there is no intention to limit the invention to such detail. To the contrary, it is intended to cover all modifications, alternatives and equivalent arrangements which fall within the spirit and scope of the invention as defined by the appended claims.

Figure 1:
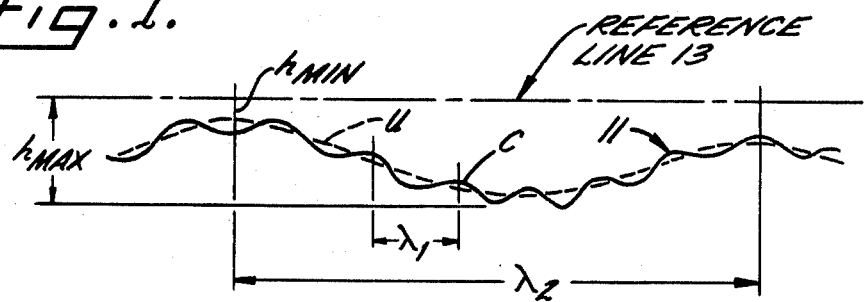
FIG. 1 is a greatly exaggerated schematic representation of the profile of a railroad rail which has been contoured by corrugations and undulations.

Turning now to the drawings, and referring first to FIG. 1, a greatly exaggerated schematic diagram of the profile of a worn rail is illustrated whose running surface 11 is characterized by corrugations C which are superimposed on undulations U shown in phantom. Corrugations have relatively short wavelengths $\lambda_1$, while undulations are identified by wear characterized by much larger wavelengths $\lambda_2$. Typically, corrugation and undulation wear have different causes. But as FIG. 1 illustrates, the two types of rail wear can combine to a single rail surface 11 whose distance from an arbitrary reference line 13 varies between a distance of $h_{min}$ and $h_{max}$. The combination of these two types of wear result in an irregular surface which causes severe dynamic loads to both the rail track structure and the rolling stock. Moreover, the vibration caused by these irregularities can create noise pollution and an uncomfortable ride which are especially important when the rails are used by passenger trains. With a trend toward higher axle loadings, increasing rail traffic and increasing speed, uneven rail wear has become an even greater problem.

Many attempts have been made to improve the performance of devices which measure rail contour. One approach is to make multiple measurements relative to one or more reference lines to compensate for the fact that each measurement has inherent inaccuracies, caused by a characteristic susceptibility of the reference line to vertical movement, which occurs at different rail contour wavelengths. For example, in U.S. Pat. No. 4,075,888 to Buhler, a plurality of sensors are mounted on a chassis with each sensor coupled to a different pair of rollers which ride the rail contour. Each pair of rollers is effective in establishing a stable reference point for its respective sensor only at certain frequencies. At certain other discrete frequencies the length between the roller axes interacts with the wavelength of the corrugation or undulation in the rail so as to make the associated sensor virtually "blind" to the rail contour. As a result, each sensor, supported by a different pair of rollers, has a "blind" response at different wavelengths of corrugations and undulations. By providing a plurality of sensors, the total system response is reportedly acceptable over virtually all wavelengths of corrugations and undulations. An inherent disadvantage in such a system is the requirement of calibration, synchronization and monitoring of the plurality of discrete sensors located along the length of the chassis.

A second approach to measuring corrugations and undulations in the profiles of a railroad rail is illustrated in U.S. Pat. No. 4,288,855 to Panetti. Therein, a beam is mounted on rollers for movement over railroad rail. The beam carries two sensors spaced a predetermined distance apart. The spacing determines the effective wavelength range over which the sensors can operate. Each of the sensors detect the distance from the rail to the beam. The difference between the two detected distances defines a slope which can be used to calculate a wavelength for the contour of the rail. This approach also suffers from a susceptibility to a "blind" spot where the system cannot detect rail contour at a certain frequency related to the distance separating the individual sensors. Panetti seeks to avoid the problem by providing multiple sensor pairs and limiting the detection, for a particular sensor pair, to wavelengths outside the range of the "blind" spot. This approach suffers from the same disadvantages as does the Buhler approach since it requires a plurality of sensors located along the length of the measuring device chassis which must be calibrated, synchronized and monitored in order to ensure reliable measuring of rail contour.

Yet another approach to measuring rail contour is illustrated by French Patent No. 1,503,891 to Wolf. Unlike the recent approaches of Buhler and Panetti, which utilize a plurality of sensors, Wolf preceded these approaches by several years with a single sensor located between a series of apparently equally-spaced rollers. While the system offers the advantage of not requiring calibration or synchronization of a plurality of sensors, the system is totally "blind" to corrugations and undulations of certain wavelengths.

Figure 2:
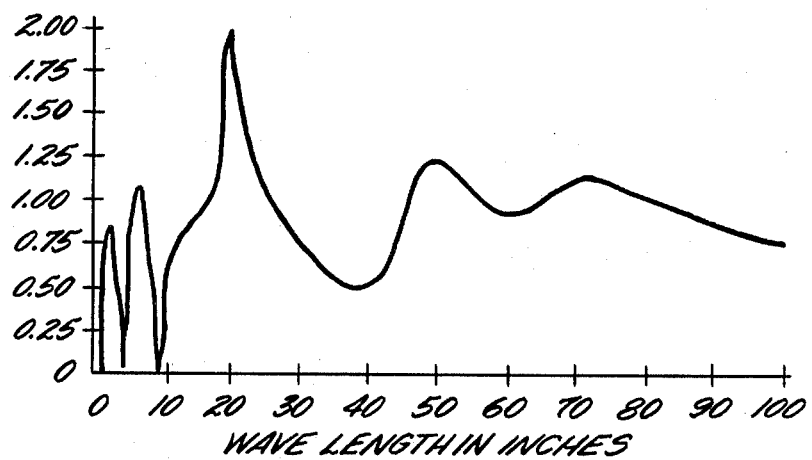
FIG. 2 is a graph illustrating the plot of the transfer function for a prior art measuring device for measuring the corrugations and undulations in a contoured railroad rail.

FIG. 2 illustrates the transfer function for a measuring system such as that of Wolf with the rollers and sensors located arbitrarily at ten inch intervals. The graph in FIG. 2 has its ordinate axis calibrated for the ratio between the measured distance h′ and the actual or true distance h from the arbitrary reference line 13 to the rail surface 11. The abscissa axis is calibrated in inches and represents the full range of wavelengths of corrugations and undulations which may commonly appear in a contoured rail. As is readily apparent from the graph, the Wolf system, with equally-spaced rollers, has "blind" spots in its transfer function. In this regard, the Wolf approach exhibits the problem the Buhler and Panetti approaches attempt to solve by using multiple sensors. In addition to "blind" spots, the transfer function in FIG. 2 exhibits large errors and sharp fluctuations in its response throughout the spectrum of relevant rail contour wavelengths.

Figure 3:
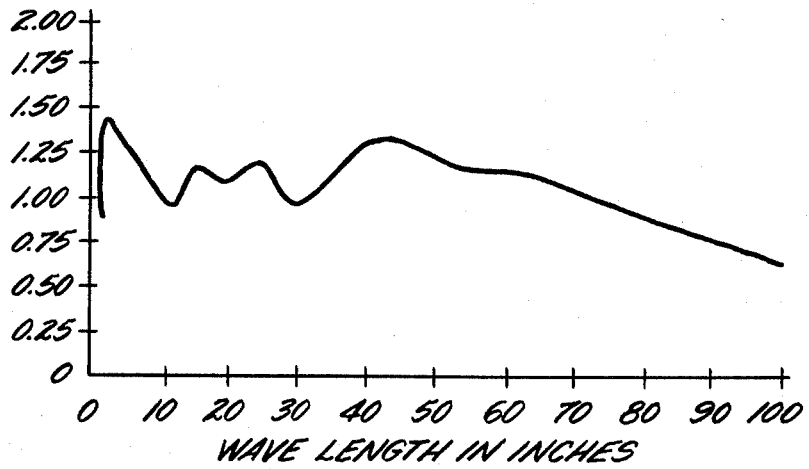
FIG. 3 is a graph illustrating the plot of the transfer function for a measuring device constructed in accordance with a preferred embodiment of the invention.

In keeping with the invention and in contrast to the FIG. 2 prior art transfer function, the transfer function in FIG. 3 represents the response of a measuring device constructed in accordance with a preferred embodiment of the invention. As is readily apparent from a comparison of the graphs of the two transfer functions, the FIG. 3 graph has a non-zero response throughout the entire relevant range of corrugation and undulation wavelengths. In particular, within the region of two inches to fifty inches wavelength, where corrugations and undulations occur most commonly, the transfer function of the measuring device according to the invention shows a particularly dramatic improvement over the transfer function illustrated in FIG. 2. Not only is the response of the measuring device according to the invention vastly improved over the prior art response, but the non-zero response throughout the relevant wavelength region and the lack of sudden and sharp fluctuations in response, make the measuring device more readily adaptable to grinding machinery which can use the measuring device of the invention to grind rail with a degree of accuracy heretofore not possible with a single sensor.

Figure 4:
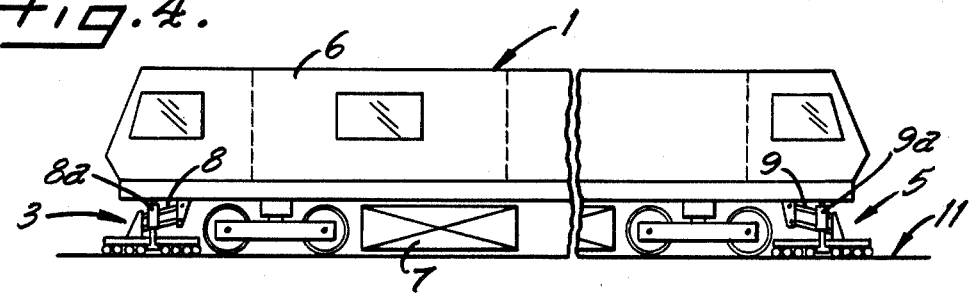
FIG. 4 is a side view of a rail grinding train utilizing two of the measuring devices according to the invention.

FIG. 4 represents the disposition of two measuring devices in a railroad rail grinding machine 1. The position of the measuring devices 3 and 5 allows the machine to measure, at the forward measuring device, the corrugations and undulations in the rail surface 11. The measurement results are fed to a grinding control and recording compartment 6 which control the grinding assembly 7 and records the contour of the rail. To check the accuracy of the grind, the trailing measuring device, either device 3 or 5 depending on the direction of the machine, measures the rail contour after the grinding assembly 7 has passed over it.

When the grinding machine is not working on a rail surface, the measuring devices 3 and 5 can be raised away from the rail surface. To lift the measuring devices, hinged parallelogram linkages 8 and 9 pivot about their hinges in response to hydraulic lifters 8a and 9a or other similar devices mounted between the grinding machine 1 and the measuring devices 3 and 5.

FIG. 5 illustrates a diagrammatic representation of the invention. A chassis 15 is supported on the railroad rail 11 by a plurality of rollers 17. The rollers 17 are aligned such that they are all tangent to a straight line connecting their lowermost points. This straight line defines a reference line 13' which, according to the invention, approximates as closely as possible a fixed-in-space arbitrary reference line 13 as in FIG. 1, as it travels over the corrugations and undulations of the rail. In the embodiment depicted in FIG. 5, four rollers 17 are distributed on each side of the chassis. Approximately centrally located on the chassis 15, is a single sensing device, schematically shown as a probe 19, which is free to follow the rail surface 11 and measure the distance h' between the rail surface and the reference line 13' established by the rollers 17. On the tail of the probe 19 is an indicator 20 whose position, relative to a reference marker 21 mounted on the chassis 15, gives a visual indication of the measured distance h' between the rail surface and the reference line 13'. It will be appreciated from the discussion hereinafter and in connection with FIG. 6, that indicator 20 and reference marker 21 are merely a schematic representation of a number of common recording devices which may be used with the invention to display and record the measurements of the probe.

In accordance with one important aspect of the present invention, the points of bearing between the chassis 15 and railroad rail 11, i.e., the points of contact of the rollers in the embodiment shown in FIG. 5, are arranged unevenly on the chassis 15, which enables the transfer function (h'/h) for the measurements of the single sensing device 19 relative to the reference line 13' to have a non-zero response throughout the range of corrugation and undulation wavelengths which closely approximates the actual deviation from a fixed reference line. Specifically, the uneven spacing $a_1$, $b_1$, $c_1$, $d_1$ and $a_2$, $b_2$, $c_2$, $d_2$ between the eight rollers shown ensures the chassis will not succumb to oscillation or vibration of magnitudes and wavelengths similar to those of the corrugations and undulations being measured. As different wavelengths of corrugations and undulations are encountered on the rail surface 11, different combinations of rollers 17 form points of bearing on the rail, thereby ensuring the chassis rides high on the peaks of the corrugations and undulations for all wavelengths. Consequently, the reference line 13' is not susceptible to the type of horizontal movement which causes the severe distortion in the measured distance h' illustrated in FIG. 2. For example, the particular roller distribution of FIG. 5a yields the transfer function shown in FIG. 3. Although FIG. 5a shows for eight rollers the best spacing known, it will be appreciated that other particular variable spacings and quantities of rollers may give better results. In particular, since the invention only requires at least variable spacing of the points of bearing between the rail surface and the chassis, better spacing than that shown in FIG. 5a may be found from continued experimentation with various possible spacings.

Figure 10:
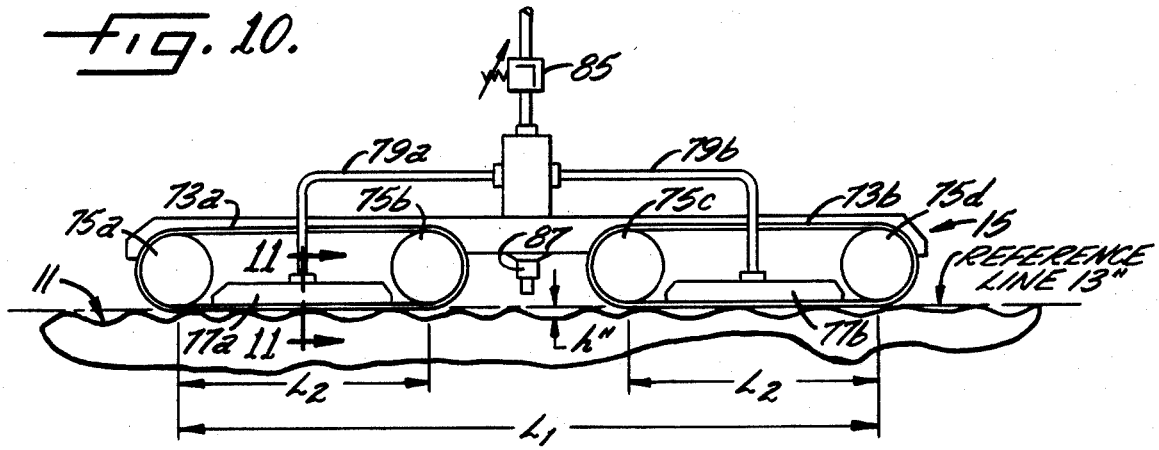
FIG. 10 is a diagram of a measuring device in accordance with a second embodiment of the invention.

FIG. 6 illustrates a schematic representation of one type of measuring and recording system which might be employed with the chassis 15. A transducer 23 provides an electric signal in response to the movement of the probe 19 over the rail surface 11. It will be appreciated from the discussion hereinafter, and from an inspection of FIGS. 7 and 8, that probe 19 may be in the form of a roller which follows the contour of the rail. A non-contacting proximity sensor, as illustrated in FIG. 10, might also be employed. From the transducer 23, an analog signal representing the measured distance h' is delivered to a signal conditioner 25 which converts the signal from the transducer 23 to a signal compatible with further processing. Depending on the particular system the conditioning could be in the form of analog filtering, voltage reduction amplification or combinations thereof. From the signal conditioner 25 a conditioned analog signal representing a measured distance h' between the rail surface and the reference line 13' is delivered to a control circuit 27. In addition to the conditioned signal h', the control circuit 27 also receives an analog signal x from a tachometer 29 which is an indication of the speed of the chassis 15 as it moves over the rail.

At the control circuit 27 the two input signals are processed to produce analog output signals, three in the system illustrated, intended for use in controlling a strip chart recorder 31 or a similar recording device. In the control circuit 27, the conditioned signal h' is filtered and translated into two analog signals with the first short wavelength signal $h'_1$ representing corrugations and the second longer wavelength signal $h'_2$ representing undulations. It will be appreciated that a single combined measurement output might also be provided. The third signal from the control circuit 27 is the analog signal x which represents the speed of the chassis 15. As applied to the strip chart recorder 31, the signals $h'_1$ and $h'_2$ are amplitude-related signals whereas the signal x is wavelength-related.

Responsive to the signal x from the control circuit 29 is a motor 33 in the strip chart recorder 31 which rotates a roller 35. Paper 37 is rotated over the roller 35 and under a pair of pen assemblies 39a and 39b. The writing points of the pens are movable along the axis 41 of the roller 35 by a small motor which is within each of the pen assemblies and which is responsive to signals $h'_1$ or $h'_2$ from the control circuit 27. As a result, accurate and permanent visual representations of the corrugations C and undulations U in the rail surface are created on the strip chart recorder paper 37.

Figure 7:
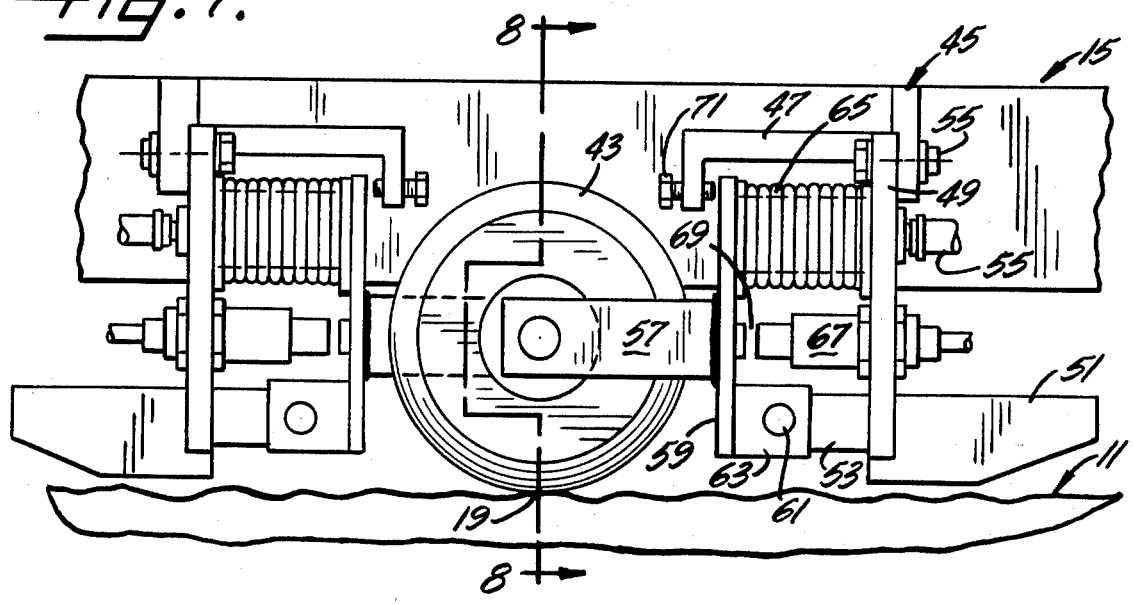
FIG. 7 is a side view of a series of rollers aligned perpendicularly to the direction of motion and serving to detect the transverse and longitudinal contour of the rail.
Figure 8:
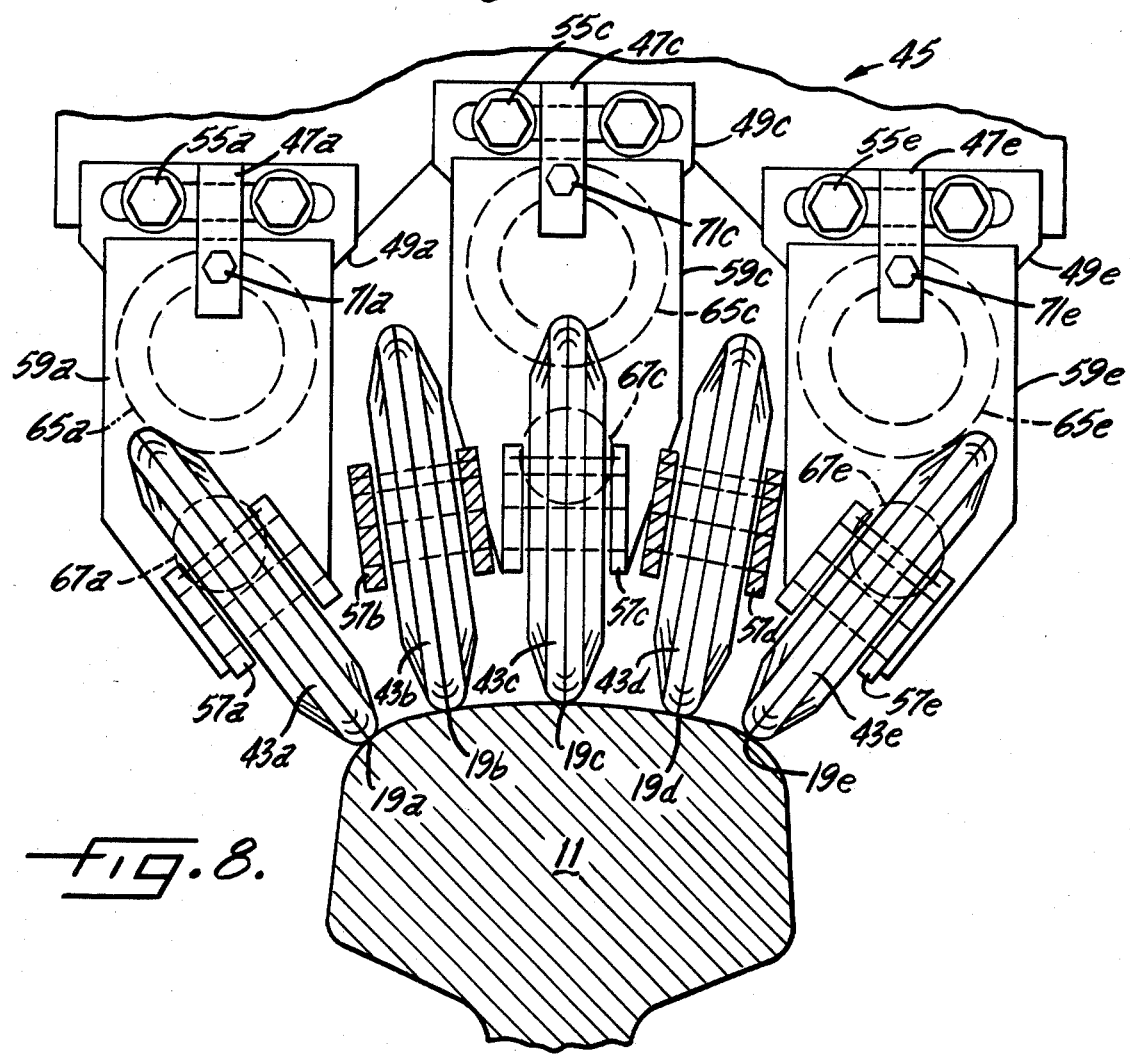
FIG. 8 is a cross-sectional view of the rollers in FIG. 6 taken along the line 8—8.

Various manipulations of the measured signals $h'_1$, $h'_2$ and x to tabulate information such as average amplitude and average wavelength for corrugations, undulations can be performed by the processor 30 in conjunction with an interactive memory 32. In addition, rail contour information can be displayed in table or graphic form on a display terminal 34. A particular display format, for the multiple transverse sensor arrangement shown in FIGS. 7 and 8, is illustrated in connection with FIG. 9. Each of the analog signals, $h'_1$, $h'_2$ (for each sensor in a multiple transverse sensor arrangement) and x are periodically sampled and held by sample and hold circuit 36. From the sample and hold circuit 36, the signals are input to the processor 30 by way of an analog to digital converter 38. The output of processor 30 may also be used as the input signals for a grinder control circuit 4. If the grinder control circuit 40 is an analog device, a digital-to-analog converter 42 can serve as an interface between the processor 30 and the grinder control circuit. The particular system architecture shown surrounding the processor 30 in FIG. 6 is intended only as one example of a general processing or computer system which may be utilized to manipulate, store and display the measured results of the measuring device according to the invention. It will be appreciated that other well-known system architectures may serve equally well to provide functions of the type performed by the particular system shown in FIG. 6.

A more detailed illustration of one embodiment of a transducer 23 which might be used in the system shown in FIG. 6, is shown in FIGS. 7 and 8. Multiple sensor rollers, five in the embodiment illustrated, may be utilized in order to measure the full transverse contour of the rail 11, the rollers 43a-e being aligned so that their points of bearing 19a-e on the rail 11 are generally transverse to the direction of motion. The sensor rollers need to be individually calibrated, and their transverse alignment synchronizes their responses. The points of bearing for the sensor rollers in FIGS. 7 and 8 are each analogous to the probe 19 in the diagrammatic model of the invention shown in FIG. 5. Although multiple sensor rollers are utilized in order to measure the full transverse contour or profile of the rail 11, longitudinally the sensing device measures a single point on the rail 11.

In order to permit the several rollers to be compactly arranged across the rail surface, the rollers are alternatively mounted from ahead of and behind their contact points, to form an interleaved arrangement. The mounts for only three of the rollers, 43a, 43c and 43e appear in FIG. 8. For this same reason, only one roller 43 and its associated mounting components are shown in the side elevation of FIG. 7, though a portion of the mounting components for the roller to the rear are visible. Inasmuch as each of the five rollers and their mounting components are very similar, specific letter designations are omitted in FIG. 7.

The sensor roller 43 is supported on the chassis 15 by a connecting structure fixed to the chassis 15, comprising a flange 45, L-shaped bracket 47, bar 49, guard plate 51 and pivot stub 53. Flange 45 is integral with the chassis 15 and is connected to bar 49 by a bolt and slot assembly 55 best illustrated in FIG. 8. Preferably, L-shaped bracket 47, guard plate 51 and pivot stub 53 are welded to bar 49 or are by some other means made integral with the bar.

Directly supporting the roller 43 in FIG. 7 is a bracket 57 which is welded to a bar 59 which is positioned substantially parallel to bar 49. Holding the bar 59 in place, and also allowing the roller 43 to respond to changes in the rail surface, is a pin 61 through the pivot stub 63 welded to the bar 59 and through the pivot stub 53.

A bellows chamber 65 spans the distance separating the upper ends of the two substantially parallel bars 49 and 59. Pressurized air within the bellows chamber 65, delivered from an air hose 66, serves to enable the bellows chamber to press the sensor roller 43 against the rail 11 and thereby prevent the roller from skipping over the rail surface, especially at high speeds. Also spanning the distance between the two bars 49 and 59 is a proximity sensor 67 which responds to changes in the gap 69 as the sensor roller 43, bracket 57, bar 59 and pivot stub 63 pivot about pin 61. In response to the dynamic variation of the gap 69 as the chassis travels over the rail 11, the proximity sensor 67 outputs a signal which represents the distance h' measured between the rail surface and the reference line 13'. As explained in connection with FIG. 6, the signal may be conditioned to provide a record of the measured rail contour.

As indicated in connection with FIG. 4, the measuring device may be lifted away from the rail 11 when not in use. Accordingly, L-shaped bracket 47 and threaded screw 71 provide an adjustable stop which limits the downward stroke of the sensor roller as it is lifted away from the rail surface. To limit the upward stroke of the sensor roller so as to protect the proximity sensor 67 from damage, the guard plate 51 is fixed to the lower end of the bar 49. If corrugations of too great an amplitude are encountered, guard plate 51 will contact the rail 11 and lift the entire chassis 15 thus preventing damage to the proximity sensor.

In order to provide an easily interpreted graphic representation of rail wear across an entire transverse section of rail, the display terminal 34 of FIG. 6 may simultaneously receive the outputs $h'_a$–$h'_e$ of the multiple sensor rollers 43a-e, by way of processor 30. It is contemplated that one manner in which the rail contour or profile might be displayed is by way of the graphic display shown in FIG. 9. The individual sensor roller outputs $h'_a$–$h'_e$ are displayed by their degree of deviation from an ideal or unworn transverse contour or profile $P_{IDEAL}$.

Figure 9:
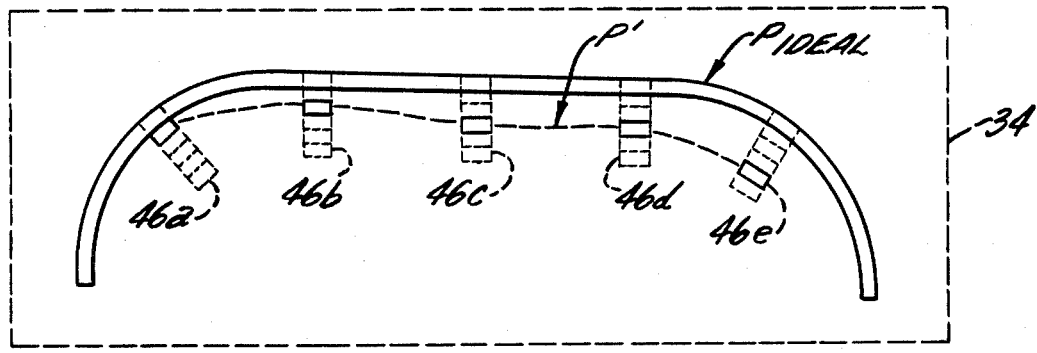
FIG. 9 is a schematic representation of display responsive to the measured transverse contour showing the deviation of the transverse contour of a worn rail from the ideal transverse contour of an unworn rail.

The ideal or unworn transverse contour might be a template over the display or a fixed pattern continuously displayed on the terminal 34. Wear as measured by each of the five sensor rollers 43a-e is translated by way of processor 30 in FIG. 6 to a visual indication at the display terminal 34. FIG. 9 shows a series of light segments arranged in five columns 46a-e and oriented along the ideal or unworn transverse contour so as to indicate the sensing positions across the rail profile of the five sensor rollers 43a-e. By interpolation, the dashed line connecting the illuminated segments approximates the transverse contour or profile of the rail being measured.

Because the transverse top profile of a worn rail is not a regular curve, it may be desirable to develop more points, i.e., more columns 46, to more accurately depict the contouring. This can be done by providing a second set of sensor rollers, identical to the rollers 43, mounted just ahead or behind the rollers 43 but with the rollers of the second set being transversely offset from the rollers 43 so as to contact the rail head along lines running between the contact lines of the rollers 43. This would give ten points, or columns of the type 46 shown in FIG. 9, to better define the true rail head transverse contour. However, in such a double roller set arrangement, only the rollers 43 would be used to provide information analogous to the probe 19 and the second roller set would only serve to define the transverse contour.

Figure 11:
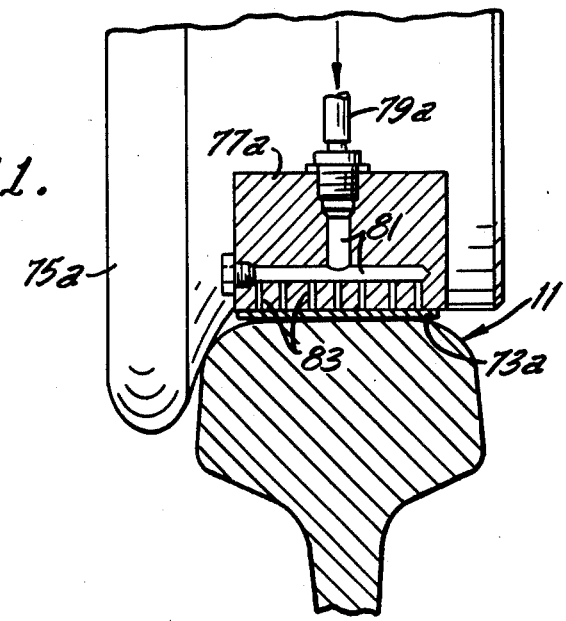
FIG. 11 is a cross-sectional view of the measuring device in FIG. 10 taken along the line 11—11 and showing increased detail.

Referring now to FIGS. 10 and 11, an alternate embodiment is shown for the measuring device according to the invention. In this embodiment, endless belts 73a and 73b provide vide the support for chassis 15 on the surface of rail 11 which was provided by the unevenly spaced rollers shown in FIG. 5. The endless belts 73a and 73b are supported and tensioned by pairs of rollers 75a, 75b, 75c, and 75d respectively, the lower surfaces of which are aligned such that the bottoms of the endless belts define a reference line 13". In the area in which the belts 73a and 73b travel between the rollers' axes of rotation, guide plates 77a and 77b, having planar lower surfaces, are stationed so as to maintain the reference line 13" between the rollers in each roller pair. In accordance with the invention, the total distance $L_1$ between the axes of rotation of the outermost rollers should be greater than the longest expected wavelength of corrugations and undulations in the rail surface. Similarly, the distance $L_2$ between the rollers of the individual roller pairs should be maximized, consistent with providing adequate central spacing for the sensor discussed below, to allow the belts to ride high on the peaks of the undulations and corrugations as possible.

To prevent excessive heat build-up through friction at the surface interface between the guide plates and the endless belts, pressurized air may be fed through an air nozzle 79a into air ducts 81 and out onto the belt-guide plate interface through capillaries 83. Pressure adjustment can be made at a pressure reducing valve 85.

In FIG. 10 a sensor 87, mounted on the chassis 15, is illustrated schematically to be a proximity sensor where the distance measured is the distance h" from the reference line 13".

As can be seen from the foregoing detailed description this invention provides an improved apparatus and method for sensing the contour in railroad rails by assuring that the points of contact between the chassis assembly and the measured rail are at all times close to or at the peak of the rail's undulations and corrugations. Accordingly, this limits the vertical motion or vibration of the moving chassis, allowing a single measuring device carried thereon to exhibit a reasonably good response for all wavelengths of corrugations and undulations. Therefore, the measuring device according to the invention does not require a plurality of synchronized sensing devices spaced longitudinally along the length of the chassis to mask or otherwise overcome the previous deficiencies of a single sensor. Furthermore, the measuring device according to the invention is capable of reliable operation during relatively high speed travel over the rail's surface. This high speed reliability allows the measuring device to be used for periodic maintenance checks which might otherwise be impractical on rails which experience a high traffic density.

I claim as my invention:

1. Apparatus for measuring corrugations and undulations along the running surface of railroad rail comprising:
   a chassis adapted for travel along said railroad rail;
   at least four bearing points positioned between said chassis and said railroad rail for supporting said chassis on said rail and for allowing movement of said chassis over said rail, said bearing points being aligned so as to collectively define a reference line with any space between said bearing points being in an asymmetrical pattern to establish the reference line substantially between the highest points encountered by the bearing points by, whereby the distance between a sensing point on the reference line and said running surface represents substantially the actual wear of the running surface;
   sensing means at the sensing point for continuously sensing the vertical distance between the reference line defined by the bearing points and the surface of the rail as the chassis travels along the rail, the sensing means having an output wheich is a function of the sensed distance between the reference line and the rail surface; and
   means responsive to the output of said sensing means to indicate the corrugation and undulation in the rall surface.

2. An apparatus for measuring corrugations and undulations along the running surface of railroad rail as set forth in claim 1 wherein said plurality of bearing points are the points of contact between said rail and rollers mounted on said chassis, said rollers being variably spaced along the length of said chassis.

3. An apparatus for measuring corrugations and undulations along the running surface of railroad rail as set forth in claim 2 wherein a total of at least eight rollers in employed with at least four rollers being positioned on each side of said sensing means.

4. An apparatus for measuring corrugations and undulations along the running surface of railroad rail as set forth in claim 1, wherein said sensing means includes a plurality of discrete sensors positioned substantially transverwely to said rail.

5. An apparatus for measuring corrugations and undulations along the running surface of railraod rail as set forth in claim 4, wherein a total of at least three sensors are employed with each of said sensors sensing a point on the transverse profile of the rail.

6. An apparatus for measuring corrugations and undulations along the running surface of railroad rail as set forth in claim 4 wherein each of said plurality of discrete sensors comprises:
   a resiliently supported sensing roller which travels along the surface of the rail at the sensing point, the plurality of the sensing rollers being spaced transversely across the profile of the rail; and
   transducer means associated with each of said sensing rollers for sensing the movement of said sensing roller substantially normal to the surface of said rail.

7. An apparatus for measuring corrugations and undulations along the running surface of railroad rail as set forth in claim 6, wherein each of said sensing rollers in mounted to a bracket hinged to said chassis and said transducer means are fixed to the chassis, said transducer means sensing the movement of said brackets relative to said chassis and each generating an output corresponding to the movement of one of said sensing rollers.

8. An apparatus for measuring corrugations and undulations along the running surface of railroad rail as set forth in claim 7, wherein at least one of said brackets is mounted on the opposite side of said sensing point relative to the others of said brackets.

9. An apparatus for measuring corrugations and undulations along the running surface of railroad rail as set forth in claim 1 wherein a total of at least eight bearing points is employed with at least four bearing points being positioned on each side of said sensing means.

10. An apparatus for measuring corrugations and undulations along the running surface of railroad rail as set forth in claim 1 wherein the sensing means comprises at least one resiliently supported sensing roller for traveling along the surface of the rail and contacting the rail at the sensing point and transducer means for sensing the vertical movement of said sensing roller.

11. An apparatus for measuring corrugations and undulations along the running surface of railroad rail as set forth in claim 10 wherein the sensing roller is mounted to a bracket hinged to said chassis and said transducer means is fixed to the chassis, said transducer means sensing the movement of said bracket relative to said chassis to generate said output.

12. An apparatus for measuring corrugations and undulations along the surface of railroad rails, said apparatus comprising:
   a chassis;
   means for supporting said chassis over said railroad rail and adapted for travel along said rail and having at least four bearing points collectively defining a reference line associated therewith which is parallel to the direction of chassis motion;
   a single sensing device mounted on said chassis for sensing the distance between said reference line on said means and a line on daid rail perpendicular to the direction of motion;
   said plurality of bearing points arranged such that the space between any two of said plurlaity of bearing points is unequal to the space between any other two of said plurality of bearing points;

said supporting means limiting movement of said chassis perpendicular to the direction of motion such as to yield a response of said single sensing device over the range of wavelengths in which the majority of undulations and corrugations occur which closely approximates the actual deviation of the rail surface from a fixed reference line.

13. An apparatus for measuring corrugations and undulations as set forth in claim 12 wherein the bearing points are points on rollers which come in direct contact with said rail and which collectively define said reference line.

14. An apparatus for measuring corrugations and undulations as set forth in claim 13 wherein a total of at least eight rollers in employed with at least four rollers being positioned on each side of said sensing means.

15. An apparatus for measuring corrugations and undulations along the surface of railroad rails as set forth in claim 6 wherein said means for supporting said chassis over said railroad rail defines a reference line along the points of contact between said means and said rail surface; and said means preventing said reference line from being excited into oscillation by the corrugations and undulations in said rail which would otherwise prevent detection of the corrugations and undulations having a wavelength of the order of two inches to fifty inches.

16. An apparatus for measuring corrugations and undulations as set forth in claim 12 wherein a total of at least eight bearing points is employed with at least four bearing points being positioned on each side of said sensing means.

17. An apparatus for measuring corrugations and undulations as set forth in claim 16 wherein the four bearing points on one side of said sensing means are spaced substantially 27.95, 19.94, 13.56 and 7.93 inches from said sensing means and the four bearing points on the other side of said sensing means are spaced substantially 27.95, 20.22, 13.48 and 7.66 inches from said sensing means.

18. Apparatus for measuring corrugations and undulations along the running surface of railroad rail comprising:

a chassis adapted for travel along said railroad rail;

a plurality of bearing points positioned between said chassis and said railroad rail for supporting said chassis on said rail and for allowing movement of said chassis over said rail, said bearing points being aligned so as to define a reference line and at least variably spaced on opposite sides of a sensing point, at least one bearing point on each side of the sensing point contacting the rail surface as the chassis travels along the rail;

sensing means at the sensing point for continuously sensing the distance between the reference line and the surface of the rail as the chassis travels along the rail, the sensing means having an output which is a function of the sensed distance between the reference line and the rail surface;

means response to the output of said sensing means to indicate the corrugation and undulation in the rail surface; and said plurality of bearing points are the points of contact between said rail and at least one endless belt with a portion of said endless belt is held in a planar configuration between two axes of rotation and along said plurality of bearing points by a guide plate located within the closed loop formed by said endless belt.

19. An apparatus for measuring corrugations and undulations along the running surface of railroad rail as set forth in claim 18 wherein said guide plate includes a planar surface adjacent to and interfaced with the inside surface of said endless belt in which the corresponding outside surface describes said planar configuration and said apparatus further comprises means for cooling the interface between said guide plate and said endless plate.

20. An apparatus for measuring corrugations and undulations along the surface or railroad rails, said apparatus comprising:

a chassis;

means for supporting said chassis over said railroad rail and adapted for travel along said rail and having a reference line associated therewith which is parallel to the direction of chassis motion;

a single sensing device mounted on said chassis for sensing the distance between said reference line on said means and a line on said rail perpendicular to the direction of motion;

said means limiting movement of said chassis perpendicular to the direction of motion as to yield a response of said single sensing device over the range of wavelengths in which the majority of undulations and corrugations occur which closely approximates the actual deviation of the rail surface from a fixed reference line; and said means comprises two pairs of rotating members with each pair located on opposite sides of said single sensing device and each pair of rotating members connected by an endless belt having two axes of rotation with said belt surface bearing on said rail surface so as to move said chassis along said railraod rail response to belt rotation in a manner which inhibits oscillation of said reference point in a direction perpendicular to the direction of motion.

* * * * *